April 24, 1928.
B. K. ROSE
1,667,463
FASTENING DEVICE FOR FENCING, ETC
Filed Feb. 11, 1927
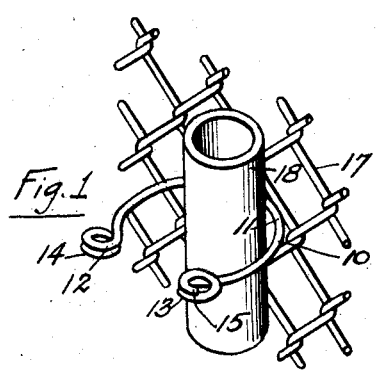
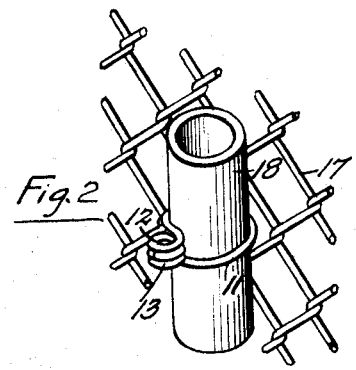
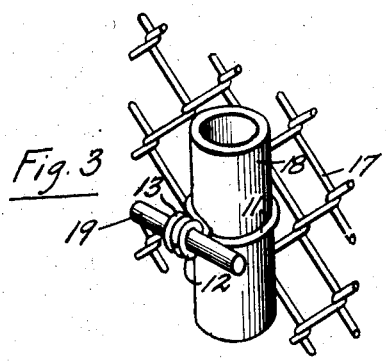
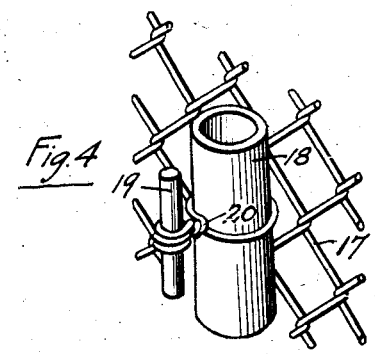
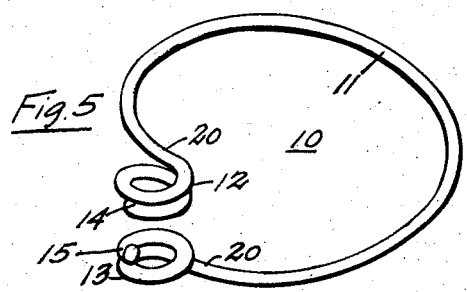
INVENTOR Patented Apr. 24, 1928.

1,667,463

UNITED STATES PATENT OFFICE.

BENJAMIN K. ROSE, OF WARREN, OHIO, ASSIGNOR TO FROST STEEL PRODUCTS, INC., OF WARREN, OHIO, A CORPORATION OF OHIO.

FASTENING DEVICE FOR FENCING, ETC.

Application filed February 11, 1927. Serial No. 167,521.

My invention relates to fastening devices and particularly to ties or clips for securing industrial and farm fencing to metal supporting posts, but the invention is also suitable for use in various other ways, such as for pipe hangers, as a means for tying various objects together, etc.

The primary object of my invention is to provide a clip which shall be simple and inexpensive to manufacture, easy to apply and install, and reliable and durable in service.

For securing woven fence to supporting fence posts to enclose industrial or farm areas, it is desirable to provide fastening clips that shall be relatively strong and durable, and that can be easily applied. In view of the large number of clips required for such purposes it is desirable to manufacture them as economically as possible.

In order to provide a fastening clip having such desirable qualities, I form the clip that is preferably of galvanized steel or copper-covered wire, and shape it to constitute a body portion of substantially loop form, with the ends turned to constitute eye portions. The loop and the eyes may be oval, rectangular, circular, or of other form. After the clip is slipped over a strand of the wire fencing and around a supporting post, a suitable tool is inserted in the eyes at the ends of the loop and they are then twisted to securely close the loop and lock the clip in position.

By providing the clip with integral fastening means, it may be made in a single piece, which is cheaper to manufacture, handle and install. By shaping the integral fastening means in the form of eyes, any rod of suitable size may be used to twist the ends and the need for a special tool is obviated.

The wire provides substantial rigidity and strength, and is, at the same time, sufficiently flexible to permit it to be easily opened by hand to slip over a fence post and then reclosed by hand to permit a twisting tool to be inserted in the end loops or eyes.

The construction of the clip and the manner in which it is applied are illustrated in the accompanying drawings in which—

Figure 1 is a perspective view showing a clip slipped over a strand of woven fence and around a supporting post, with the loop still open, Fig. 2 is a similar view, but showing the loop closed to bring the end loops or eyes adjacent to each other, Fig. 3 is a view showing a rod inserted in the eyes and a half twist given to the loop, by a suitable rod, Fig. 4 shows the loop, with a full twist given thereto, and Fig. 5 is a perspective view of the clip itself.

As is illustrated in the accompanying drawings, the clip 10 consists of a single piece of wire shaped to constitute a body portion 11 and two end loops or eyes 12 and 13 with overlapping ends 14 and 15, to impart additional strength to the eyes and to assist in maintaining them closed during the twisting operation.

The wire may be made of material that is preferably non-corrosive, such as copper or galvanized wire, and having the necessary strength and flexibility.

When the clip is to be installed, it is slipped over a strand of the wire fencing 17 and around the supporting post 18 to which the fence is to be secured, as shown in Fig. 1. Owing to the flexibility of the loop, it may be easily opened by hand and slipped around the post 18.

The loop is then closed, to the position shown in Fig. 2, at which the two end loops or eyes 12 and 13 register to permit the insertion of any suitable tool or ordinary rod 19 of proper size, as shown in Fig. 3. By means of the rod 19 and the eyes 12 and 13, the portions 20 of the loop, adjoining the eyes, may be twisted, as shown in Figs. 3 and 4, to close the clip and cause it to secure the fence tightly to the post.

By forming the clip of one piece of wire provided with integral end loops or eyes to enable twisting the clip to close it, a simple and inexpensive product may be obtained which is easy to handle and to apply.

The formation of eyes in the ends of the loop member avoids the presence of protruding ends that would tend to tear clothing, injure livestock, etc., as in the case of twisted wire ties heretofore commonly employed and whose ends are frequently pointed or jagged.

My invention is not limited to the specific design that is illustrated, since it may be variously modified without departing from the spirit and scope of the invention as set forth in the appended claim.

I claim as my invention:—

The combination with a wire fence and a post therefor of a fastening clip comprising a loop-like strand of wire surrounding one of the fence strands and the post and having its ends formed to constitute opposed helixes that have been given rotative movement as a unit in order to twist the adjacent portions of said fastening clip.

In testimony whereof I, the said BENJAMIN K. ROSE, have hereunto set my hand.

BENJAMIN K. ROSE.